United States Patent [19]

Kasugai et al.

[11] Patent Number: 4,905,726
[45] Date of Patent: Mar. 6, 1990

[54] FUEL INTERCEPTION VALVE

[75] Inventors: Joji Kasugai, Ichinomiya; Norikazu Hosokawa, Aichi, both of Japan

[73] Assignee: Toyoda Gosei Co., Ltd., Nishikasugai, Japan

[21] Appl. No.: 266,863

[22] Filed: Nov. 3, 1988

[30] Foreign Application Priority Data

Dec. 11, 1987 [JP] Japan .................. 62-314915

[51] Int. Cl.$^4$ ............ F16K 31/22; F16K 33/00
[52] U.S. Cl. ................ 137/433; 137/512.1; 137/512.2; 220/203
[58] Field of Search ............ 137/39, 40, 43, 430, 137/433, 512, 512.1, 512.2, 512.5; 220/203, 303, DIG. 33; 222/500

[56] References Cited

U.S. PATENT DOCUMENTS

| 939,196 | 11/1909 | Goff | 137/433 |
|---|---|---|---|
| 1,897,492 | 2/1933 | Ledoux | 137/433 |
| 3,495,617 | 2/1970 | Zifferer | 137/433 |
| 4,540,103 | 9/1985 | Kasugai et al. | 220/203 |
| 4,572,396 | 2/1986 | Kasugai et al. | 220/203 |
| 4,588,102 | 5/1986 | Kasugai | 220/203 |
| 4,666,056 | 5/1987 | Kasugai et al. | 220/203 |
| 4,676,390 | 6/1987 | Harris | 220/203 |
| 4,685,584 | 8/1987 | Harris | 220/204 |
| 4,694,847 | 9/1987 | Szlaga | 137/43 |
| 4,716,920 | 1/1988 | Crute | 137/39 |
| 4,724,868 | 2/1988 | Kasugai et al. | 137/516.29 |
| 4,726,488 | 2/1988 | Kasugai | 220/203 |
| 4,735,226 | 4/1988 | Szlaga | 137/43 |
| 4,785,961 | 11/1988 | Kasugai et al. | 220/203 |
| 4,795,053 | 1/1989 | Kasugai et al. | 220/203 |

FOREIGN PATENT DOCUMENTS 62-87274 3/1987 Japan .

Primary Examiner—George L. Walton
Attorney, Agent, or Firm—Cushman, Darby & Cushman

[57] ABSTRACT

A fuel interception valve which is installed to upper opening portion of a fuel tank, wherein at the normal state, the valve is opened and draft state is maintained, and at the liquid level rising state and the reversing state of the valve box, the valve is closed and the fuel is prevented from flowing away. The fuel interception valve comprises a valve box of cylindrical shape provided on upper side with a valve hole for draft; a valve body means loosely inserted in the valve box for opening and closing the valve hole in the valve box; a float arranged at lower side of the valve body means and having specific gravity smaller than that of the fuel for pushing up the valve body means to the valve close position; and a weight means acting on the float at the reversing state of the valve body and having specific gravity larger than that of the fuel for moving the valve body means to the close position.

8 Claims, 6 Drawing Sheets

FUEL INTERCEPTION VALVE

BACKGROUND OF THE INVENTION

1. Field of the Invention

The present invention relates to a fuel interception valve which is installed to the upper opening portion of a fuel tank, wherein at the normal state, the valve is opened and a draft state is maintained, and at the liquid level rising state and at the vehicle falling down sideways, the valve is closed and the fuel is prevented from flowing away.

2. Description of the Prior Art

Such a fuel interception valve is disclosed, for example, in that shown in FIG. 1 (refer to Japanese utility model application laid-open No. 62-87274).

This is a fuel vapor valve which is installed on the upper surface of a fuel tank 1 and comprises a body 2 of resin provided at the inside with a draft hole 3, a valve chest 4 and a valve hole 5 to perform communication between both parts 3 and 4; and a float 6 of resin which is loosely inserted in the valve chest 4 and openes or closes the valve hole 5 with a tip end portion 9 projecting at its upper surface, and a coil spring 7 which pushes up and urges the float 6 towards the valve hole 5 by load less than the self weight of the float 6.

Function of the valve is as follows:

The float 6 is moved downward by the self weight larger than the load of the coil spring 7 and opens the valve hole 5 and functions as a breather within the fuel tank 1, and on the other hand, the liquid level of the liquid fuel G rises, the float 6 rises by the buoyancy and the load of the coil spring 7 and the tip end portion 9 is closely contacted with the tapered inner surface 8 of the valve hole 5, and the float 6 is made of resin as starting material having specific gravity larger than that of the fuel liquid G, and at the vehicle falling down sideways the valve hole 5 is closed thereby the valve has functions as a roll over valve.

However, in the coil spring used in the fuel interception valve of the above-mentioned specification the strict load tolerance is required from the viewpoint of the functions.

When the float 6 comes to the valve close position due to the liquid surface rising and then the liquid surface falls, if the inner pressure is high and the difference between the inner pressure and the outer pressure is large, the float 6 sticks to the valve hole and the valve opening response property is not good. This tendency is noticeable when the breather function of large capacity is required and diameter of the valve hole is large.

SUMMARY OF THE INVENTION

A fuel interception valve of the invention comprises a valve box of cylindrical shape provided on at the upper side with a valve hole for draft; a valve body means guided in the motion upward and downward within the valve box for opening and closing the valve hole; a float arranged on the lower side of the valve body means and having specific gravity smaller than that of the fuel for pushing up the valve body means to the valve close position; and a weight means acting on the float at the reversing state of the valve box and moving the valve body means to the close position by the gravity.

In this construction, the motion of the valve means to the valve close position at the liquid surface rising is performed only by the buoyancy of the float, and the motion of the valve means to the valve close position at the reversing state of the valve box is performed by the motion of the weight means towards the valve hole, thereby a coil spring in which the strict load tolerance is required from the viewpoint of functions as in the prior art becomes necessary. As a result, a fuel interception valve can be provided at low cost.

Also the valve body means is made a first valve body and a second valve body for opening and closing a bypass valve hole bored at the first valve body, thereby the valve opening response property at the liquid surface falling state can be improved when the bypass valve hole is formed in small diameter.

DESCRIPTION OF THE PREFERRED EMBODIMENTS

Figure 1:
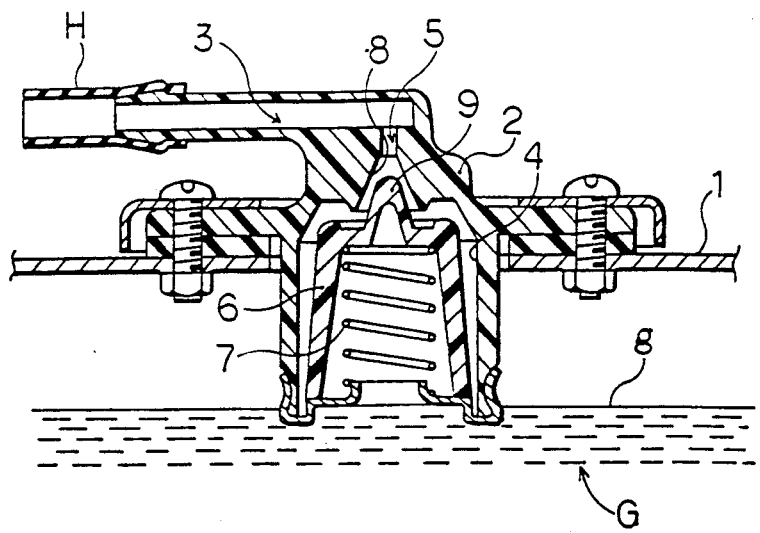
FIG. 1 is a sectional view at use mode of a fuel interception valve in the prior art.

The invention will now be described based on embodiments.

The parts similar to those the prior art are designated by the same reference numerals, and the description shall be omitted.

The First Embodiment

As shown in FIGS. 2-5, a fuel interception valve comprises a valve box 11, a valve body 16, a float 21, and a bottom plate 26.

The valve box 11 is provided at the upper side with a valve hole 5 and at lower periphery with a plurality of locking legs 12 (four legs in the figure) and in a cylindrical shape, and further provided at upper outer circumference with a flange 14 for mounting. The valve hole 5 communicates with a draft hole 3 constituted by a nipple 13, and can lead to a canister (fuel vapor diffusion suppressing device) or the like through a hose H. The lower end potion of the valve hole 5 is made a valve seat 5a in a concave taper surface with a diameter widening downward. The locking legs 12 can be bent inward with spring elasticity, and are widened downward respectively and provided at the outside of the top end portion with a pawl 12aa. The valve box 11 is made of plastic materials having spring elesticity such as polyacetal or polyamide by means of injection molding or the like.

The valve body 16 comprises a valve main body 17 with a convex taper shape corresponding to the valve seat 5a; a guide pin 17a projecting from the top end portion of the valve main body 17; a buoyancy receiving bar 17b projecting from the base portion of the valve main body 17 redially in the horizontal direction; a shank 18 projecting from the bottom of the valve main body 17 downward; and a disk 19 formed on the lower end portion of the shank 18 for preventing the float from being pulled out. The valve body 16 is made by means of injection molding or the like using plastic materials such as polyacetal having the specific gravity larger than that of a liquid fuel G and not being deteriorated by the liquid fuel G.

The float 21 is provided at the center portion with a shaft hole 22 in which the shank 18 of the valve main body 17 can be loosely inserted, and with a slit 23 which is connected to the shaft hole 22 from the outer circumference so that it can be fitted to the shank 18 from the lateral side. The float 21 is manufactured by means of injection molding using plastic meterials such as foamed styrols or nylons having specific gravity (usually 0.2-0.7) much less than that of a liquid fuel G (usually 0.75) and not being deteriorated by the liquid fuel G.

The bottom plate 26 is in a disk shape and provided on the outer circumferential portion with locking holes 27 corresponding to the locking legs 12 of the valve box 11, and is guided by the locking legs 12 and movable up and down. The bottom plate 26 is made of materials such as a metal plate (iron or aluminium plate) or a ceramic plate having specific gravity (usually 2.7-7.8) much larger than that of the liquid fuel G and not being deteriorated by the liquid fuel G.

Next, a use mode of the embodiment will be descirbed.

The fuel interception valve is installed on the upper surface of the fuel tank 1 through a retainer 28 of sheet metal and a gasket 29 respectively on the upper and lower surface of the flange 14 of the valve box 11.

In similar manner to the prior art, at the normal state, the valve is opened and the draft state is maintained, and at the liquid level rising state and a the reversing state of the valve box, the valve is closed and the fuel is prevented from flowing away.

Figure 2:
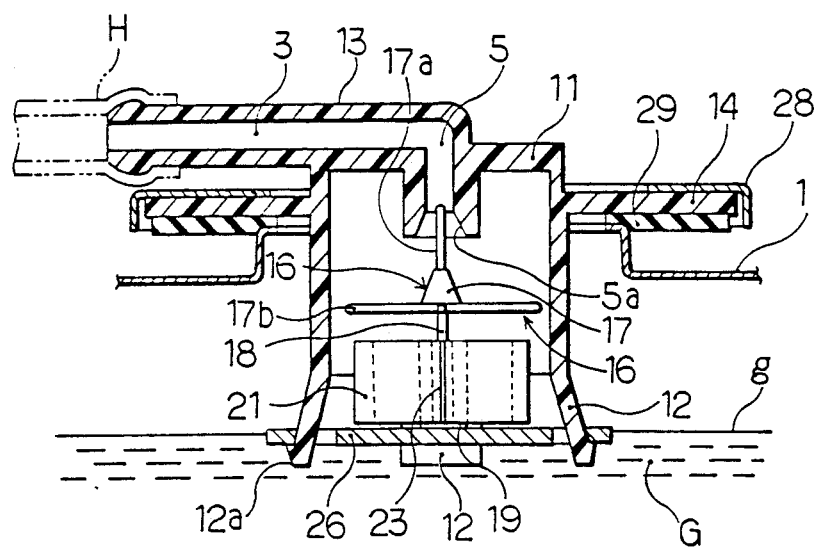
FIG. 2 is a sectional view at normal state of a fuel interception valve as a first embodiment of the invention.

That is, at the normal state, since the liquid level g of the liquid fuel G is below or slightly above the bottom plate 26, the float 21 does not rise to the float receiving bar 17b of the valve main body 17 and the valve is opened and the draft state is maintained (refer to FIG. 2)

At the liquid level rising state, the float 21 rises by the buoyancy and pushes up the valve main body 17 through the float receiving bar 17b.

Figure 3:
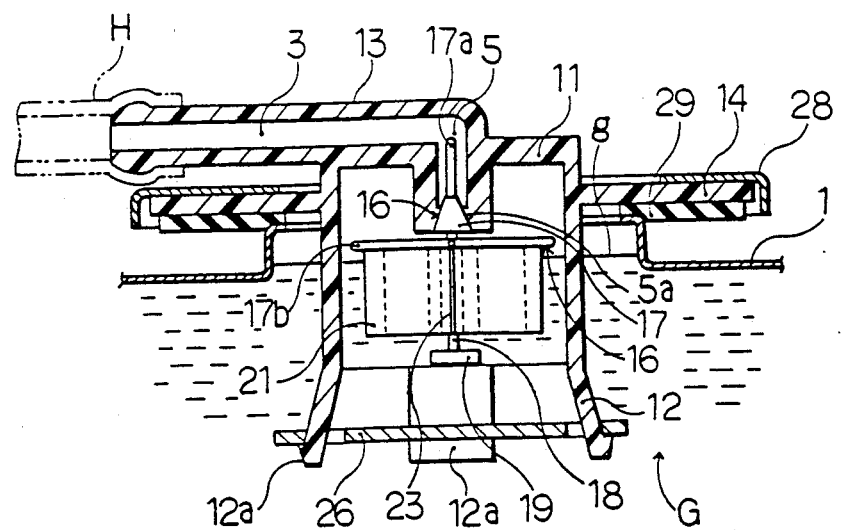
FIG. 3 is a sectional view at liquid level rising state of the fuel interception valve.
Figure 4:
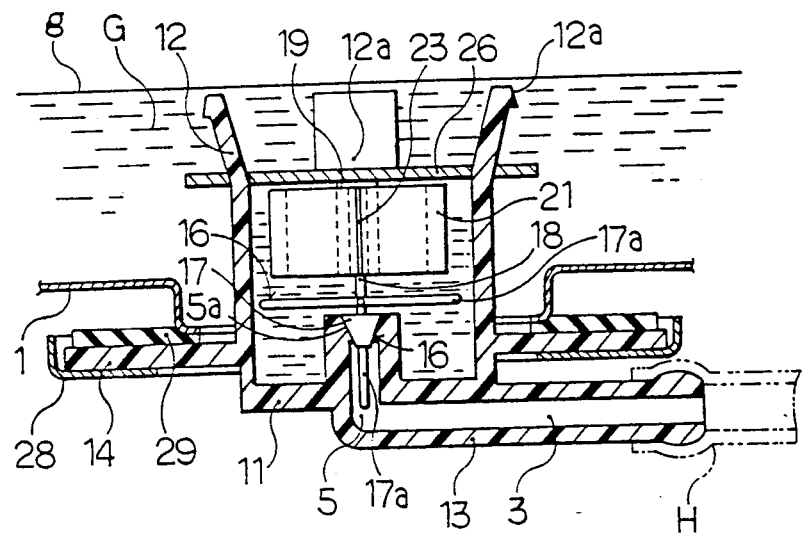
FIG. 4 is a sectional view at reversing state of the valve box of the fuel interception valve.
Figure 5:
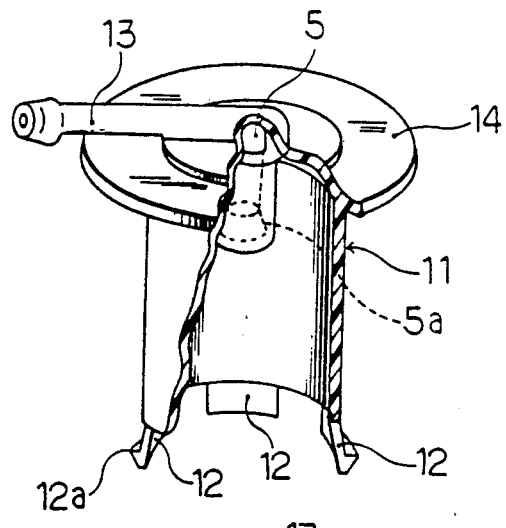
FIG. 5 is an exploded perspective view of the fuel interception valve.
Figure 5:
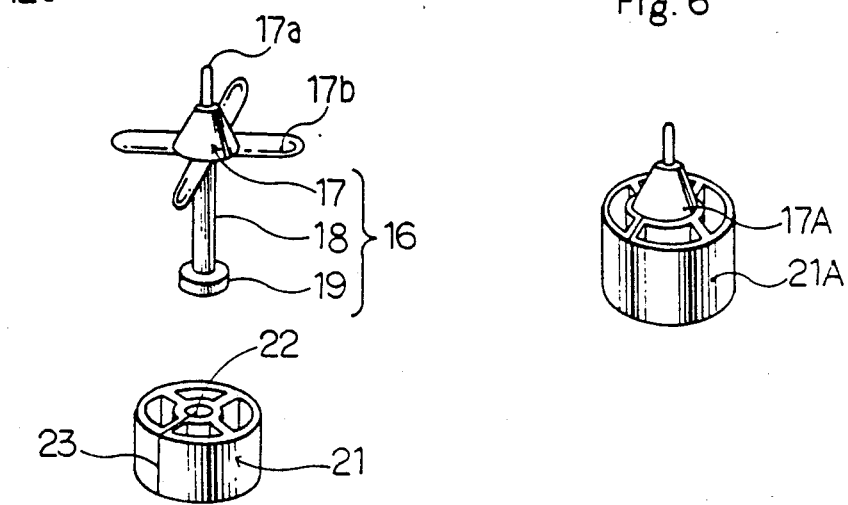

Consequently, the valve main body 17 is pushed by the valve seat 5a, and the valve is closed and the fuel is prevented from flowing out of the fuel tank (refer to FIG. 3).

At the vehicle falling down sideways, the bottom plate 26 is guided by the locking legs 12 and moved towards the valve hole 5 so that the valve main body 17 is moved towards the valve seat 5a through the disk portion 19. Consequently, the valve main body 17 is pushed by the valve seat 5a, and the valve is closed and the fuel is prevented from flowing out of the fuel tank (refer to FIG. 4).

Figure 6:
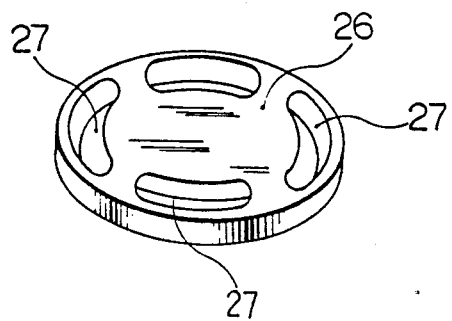
FIG. 6 is a perspective view of an example where the valve body and the float in FIG. 5 are integral.

Embodying modes of the invention is not limited to the above-mentioned embodiment, but various modes may be done as follows:

(1) The float 21A and the valve main body 17A may be integral (refer to FIG. 6). As in the embodiment, when the float and the valve main body are separate and specific gravity of the valve body is larger than that of the liquid fuel, rocking of the float corresponding to small rocking of the liquid surface is not transmitted directly to the valve main body and the generation of interference sound between the guide pin at the top end of the valve main body and the inner circumferential surface of the valve hole is small in comparison to the case that the float and the valve main body are intergral.

(2) Specific gravity of the valve body may be less than that of the liquid fuel. As in the embodiment, when the specific gravity of the valve body is larger than that of the liquid fuel, the valve main body is liable to move rapidly towards the valve hole at the vehicle falling down sideways (irrespective of whether it is integral with the float or separate), thereby the fuel interception performance is improved.

The Second Embodiment

Figure 7:
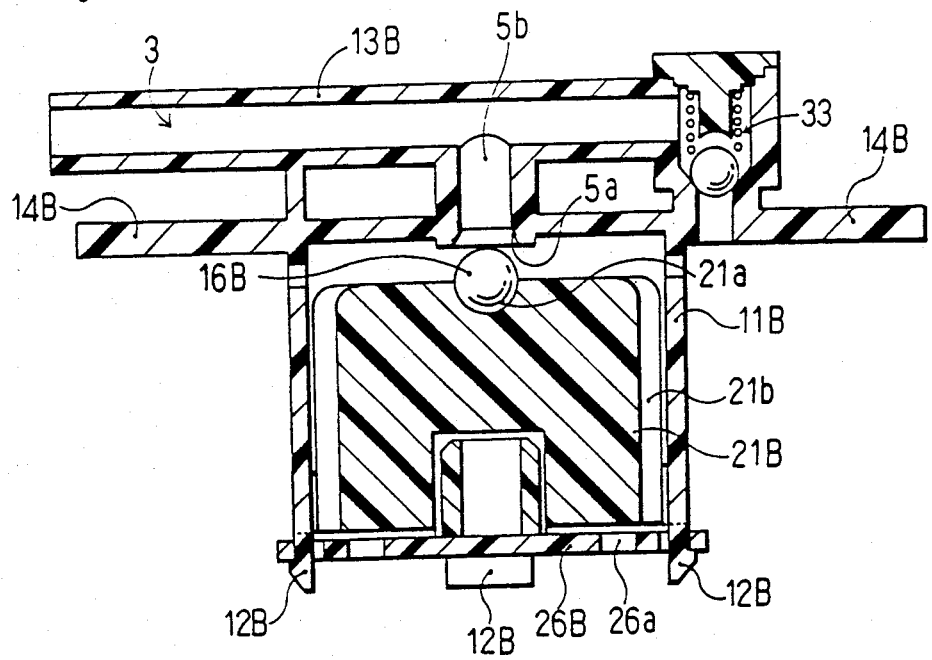
FIG. 7 is sectional view at normal state of a fuel interception valve as a second embodiment of the invention.

FIG. 7 shows a sectional view at normal state of another embodiment of the invention.

A fuel interception valve comprises a valve box 11B of the cylindrical shape provided at the upper side with a valve hole 5B for draft and on the lower periphery with a plurality of locking legs 12B; a valve body 16B loosely inserted in the valve box 11B and having specific gravity larger than that of the fuel liquid G for opening and closing a valve hole 5B of the valve box 11B; a float 21B loosely inserted in the valve box 11B, on the lower side of the valve body 16B for pushing up the valve body 16B to the valve close position by means of the buoyancy; a bottom plate on the lower side of the float 21B hold among the locking legs 12B of the valve box 11B so as to suppress the motion upward and downward. In this case, the valve body 16B is made a ball valve, and a ball valve seat concave surface 21a is formed at the center of the upper surface of the float 21B. Distance between the periphery at the lower end of a valve chest 5a of the valve box 11B and the upper surface of the float 21B is designed smaller than the diameter of the ball valve 16B at the maximum state so that the ball valve 16B is not pulled out from the lower position of the valve chest 5a.

Figure 8:
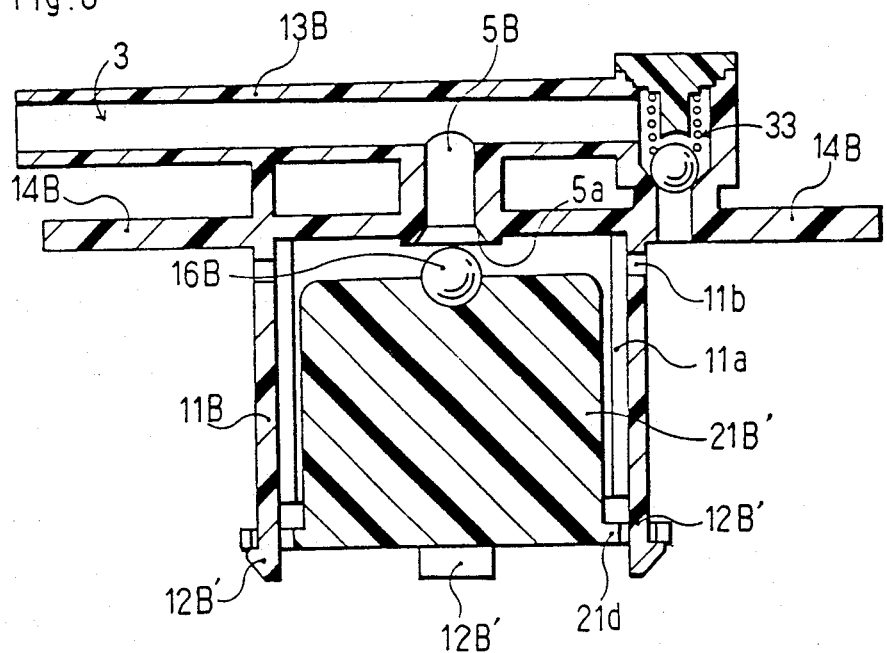
FIG. 8 is a sectional view at normal state of a fuel interception valve in modification of the second embodiment.

In this embodiment, the plurality of the guide engaging portion 21d may be formed on the outer circumference of the float 21B' so that the float 21B' is guided by the locking legs 12B' and can be moved in the axial direction thereby the bottom plate is omitted (refer to FIG. 8). Numeral 33 designates a safety valve, numerals 21b, 11a designate guide fins respectively formed on the float and the valve box, and numerals 11b, 26b designate communicating holes respectively formed on the valve box and the bottom plate.

Function of the above embodiment at the normal state and the liquid level rising state is similar to that in the first embodiment. At the reversing state of the valve box 11B, the ball valve 16B is separated from the float 21B (21B') and sunk downward by its own weight and abuts on the valve chest 5a of the valve hole thereby the valve is closed.

The Third Embodiment

Figure 9:
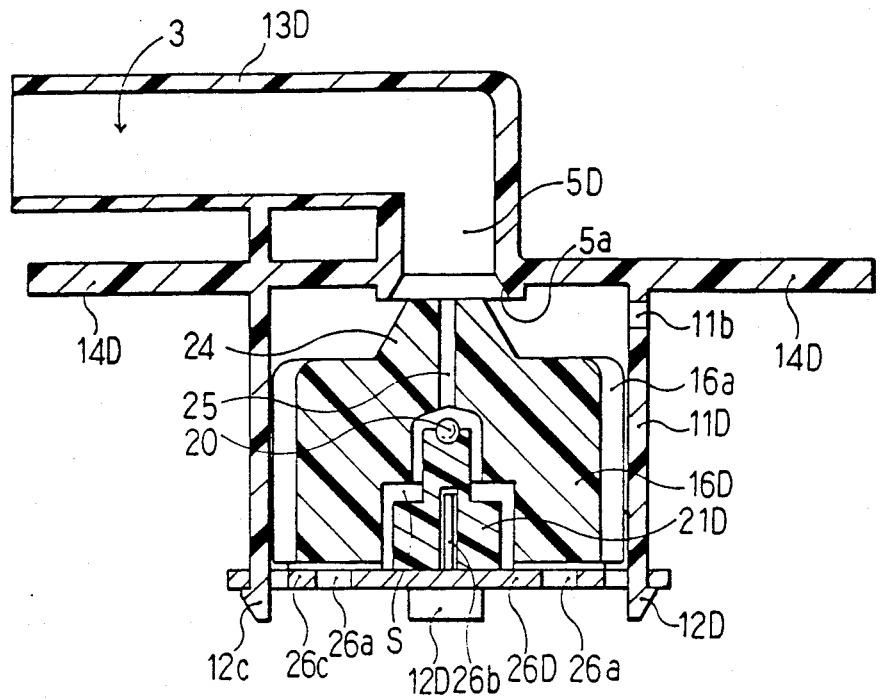
FIG. 9 is a sectional view at normal state of a fuel interception valve as a third embodiment of the invention.
Figure 10:
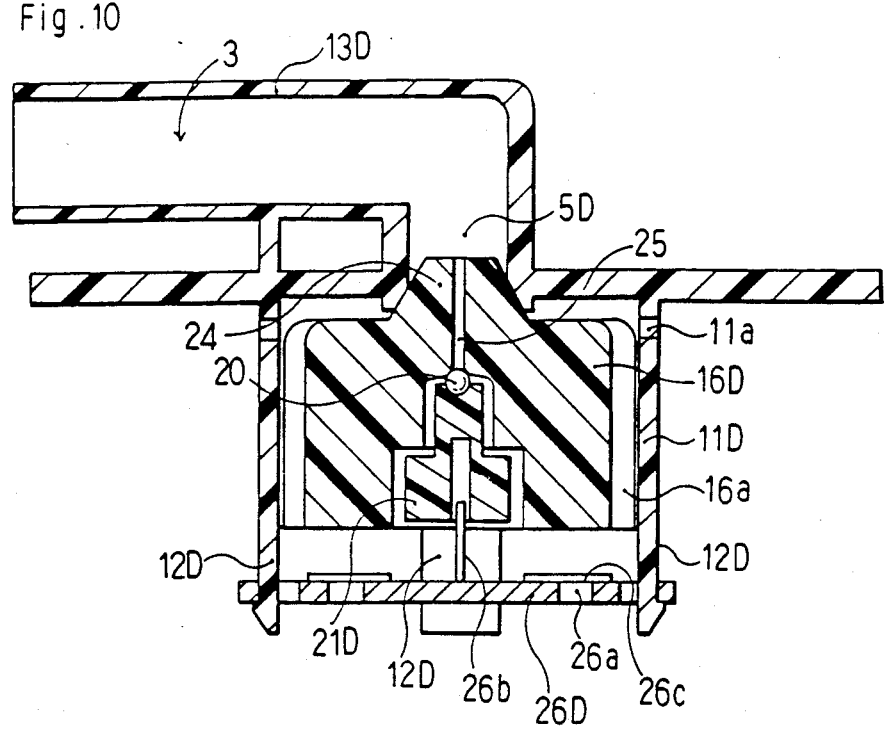
FIG. 10 is a sectional view at liquid level rising state of the fuel interception valve.
Figure 11:
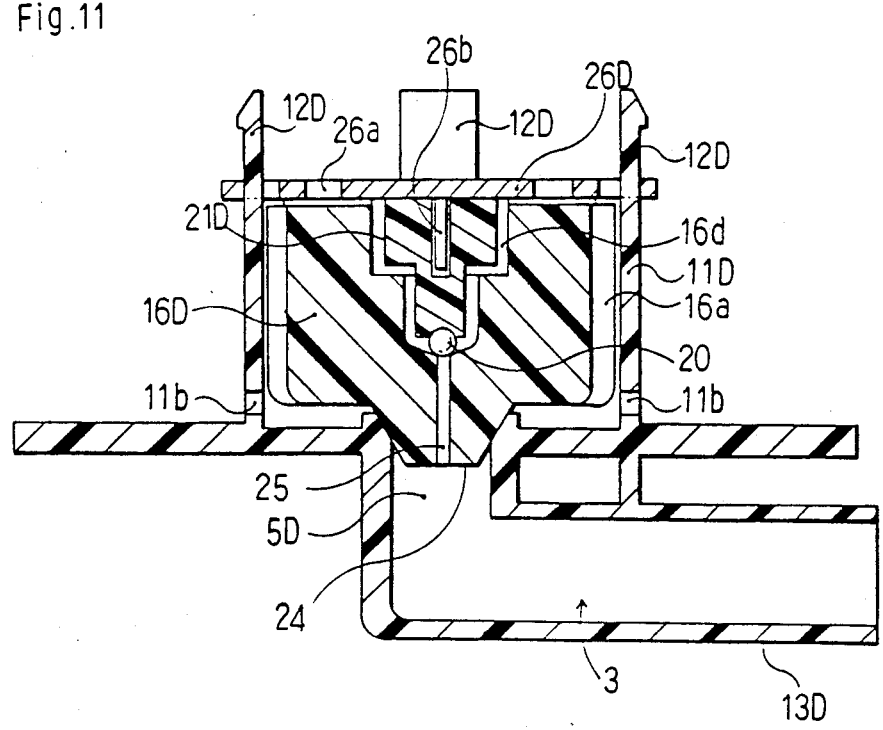
FIG. 11 is a sectional view at reversing state of the valve box of the fuel interception valve.

FIGS. 9–11 show another embodiment of the invention. FIG. 9 is a sectional view at the normal state. FIG. 10 is a sectional view at the liquid level rising state, and FIG. 11 is a sectional view at the reversing state of the valve box.

A fuel interception valve comprises a valve box 11D of cylindrical shape provided at the upper side with a valve hole 5D for draft and on the lower periphery with locking legs 12D; a first valve body 16D guided in the motion upward and downward within the valve box 11D and having specific gravity smaller than that of the fuel liquid G for openig and closing the valve hole 5D; a second valve body 20 guided in the motion upward and downward by a cylindrical space S formed at lower side of the first valve body 16D and having specific gravity larger than the fuel liquid G; a float 21D loosely inserted in the cylindrical space S at lower side of the second valve body 20 independently of the second valve body 20 and having specific gravity smaller than that of the fuel liquid G; and a bottom plate 26D guided by the locking legs 12D of the valve box 11D on the lower side of the float 21D and held movable in the axial direction.

In this case, the first valve body 16D has a first valve projection 24 with the outer circumference abutting on the valve chest 5a of the valve hole 5D of the valve box 11D, and a bypass 25 of a small diameter is formed in the first valve projection 24. The second valve body 20 is usually a ball valve made of steel, and pushed up by the float 21D to an opening at the lower end of the bypass 25 and can be moved to the close position. The bottom plate 26D is usually made of metal, and at the reversing state of the valve box, the bottom plate 26D becomes a weight means which moves the first valve body 16D against the buoyancy to the close position by the gravity. The diameter of the bypass 25 is usually 0.3–1 mm.

Function of this embodiment at the normal state, the liquid level rising state and the reversing state of the valve box is similar to that in the first embodiment. When the liquid level falls from the valve close state, even if the inner pressure is high, the pressure receiving surface at outer pressure side of the ball valve (second valve body) 20 is small. That is, even if the outer pressure acts in negative pressure state, since the attractive force is small, the ball valve 20 falls instantaneously and communication to the outside is performed throught the bypass 25, thereby the first valve body 16D subsequently falls at once and the valve opening state occurs. Consequently, the valve opening response property is good.

What is claimed is:

1. A fuel interception valve comprising:
   (a) a valve box of a cylindrical shape provided at the upper side with a valve hole for draft;
   (b) a valve body means guided in the motion upward and downward within said valve box for opening and closing the valve hole;
   (c) a float arranged on the lower side of said valve body means and having specific gravity smaller than that of the fuel for pushing up the valve body means to the valve close position; and
   (d) a weight means acting on the float at the reversing state at said valve box, said weight means being capable of axial movement within said valve box independently of said float and having specific gravity larger than that of the fuel for moving said valve body means to the close position by gravity.

2. A fuel interception valve as set forth in claim 1, wherein said float is arranged in the valve box, and the valve body is provided on the lower periphery with locking legs, and said weight means is a bottom plate which is guided by the locking legs of the valve box on the lower side of the float and held movable in the axial direction.

3. A fuel interception valve as set forth in claim 2, wherein the valve body and the float are separate.

4. A fuel interception valve as set forth in claim 2, wherein the valve body and the float are integral.

5. A fuel interception valve as set forth in claim 2, wherein the specific gravity of the valve body is larger than that of the liquid fuel.

6. A fuel interception valve as set forth in claim 2, wherein the specific gravity of the valve body is smaller than that of the liquid fuel.

7. A fuel interception valve comprising:
   (a) a valve box of cylindrical shape provided at the upper side with a valve hole for draft;
   (b) a first valve body guided in the motion upward and downward within said valve box for opening and closing the valve hole, said first valve body having a bypass of a small diameter for communicating between a cylindrical space formed within said first valve body and said valve hole, said first valve body having specific gravity smaller than that of the fuel, and being provided with a weight means having specific gravity larger than that of the fuel so as to move said first valve body against the buoyancy to the close position by gravity at the reversing state of said valve box;
   (c) a second valve body guided in the motion upward and downward by the cylindrical space of said first valve body and having specific gravity larger than that of the liquid fuel for opening and closing an opening at the lower end of the bypass; and
   (d) a float loosely inserted in the cylindrical space on the lower side of said second valve body independently of said second valve body and movable in the vertical direction, and having specific gravity smaller than that of the liquid fuel for pushing up said first valve body to the valve close position through said second valve body.

8. A fuel interception valve as set forth in claim 7, wherein said first valve body is arranged in said valve box, and the valve box is provided on the lower periphery with locking legs and said weight means is a bottom plate which is guided by said locking legs of the valve box on the lower side of the first valve body and held movable in the axial direction.

* * * * *